Oct. 10, 1961  F. C. JOHNSTON ET AL  3,004,097
BUSWAY SYSTEM
Filed May 26, 1958  4 Sheets-Sheet 1

INVENTORS
FRANK C. JOHNSTON,
PAUL KRAUSS
BY Robert A. Casey
ATTORNEY

Oct. 10, 1961 F. C. JOHNSTON ET AL 3,004,097
BUSWAY SYSTEM
Filed May 26, 1958 4 Sheets-Sheet 3

INVENTORS
FRANK C. JOHNSTON,
PAUL KRAUSS
BY Robert A. Casey
ATTORNEY

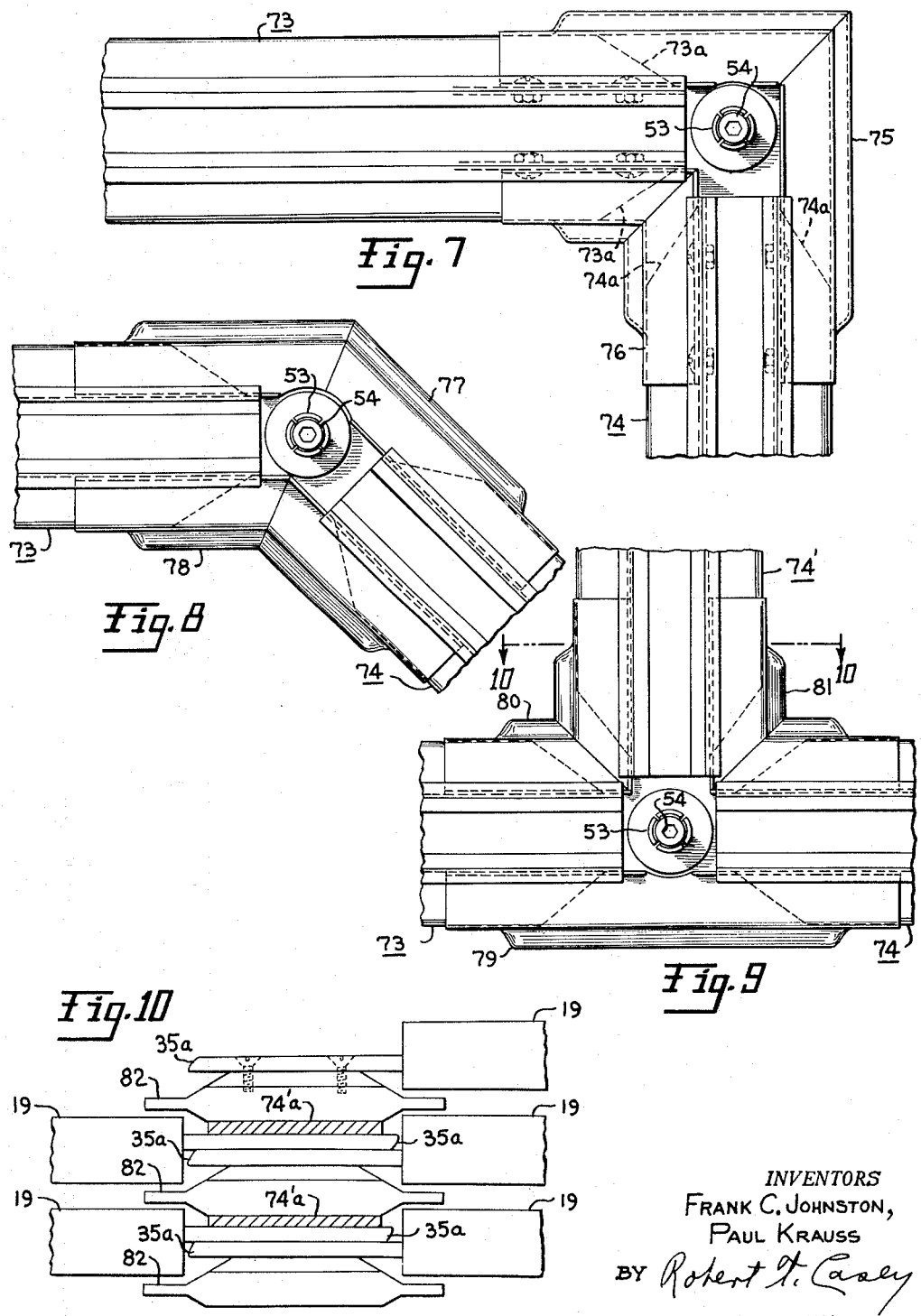

United States Patent Office 3,004,097
Patented Oct. 10, 1961

3,004,097
BUSWAY SYSTEM
Frank C. Johnston, West Hartford, Conn., and Paul Krauss, Burlington, Vt., assignors to General Electric Company, a corporation of New York
Filed May 26, 1958, Ser. No. 737,934
3 Claims. (Cl. 174—88)

Our invention relates to electric power distribution apparatus of the type including a plurality of prefabricated sections each having an elongated housing and bus bars supported therein and known as "busway systems," and to electrical and mechanical interconnecting means for such prefabricated sections.

Busway systems of the type in general use prior to the present invention have been such that the electrical and mechanical interconnection of successive lengths or sections is relatively time-consuming and laborious, and requires the use of separately-furnished loose parts, such as nuts and bolts. Such prior systems have ordinarily utilized means for individaully bolting together the adjacent ends of each pair of corresponding bus bars of each section, each such bus bar connection, for instance, usually requiring two bolts.

Application Serial Number 569,182 of L. E. Fisher, filed March 2, 1956, now Patent No. 2,906,811, assigned to the same assignee as the present invention, discloses an improved busway construction including means for interconnecting successive busway sections, including means for electrically interconnecting the bus bar conductors of one section to corresponding bus bar conductors of the succeeding section, by means of a clamping-type joint arranged to exert pressure on all of a number of overlapped bus bar ends at the same time, thus affording an extremely compact and efficient busway connection means.

The busway system construction disclosed in the above-mentioned Fisher patent requires that successive busway sections be joined together by longitudinal movement of one busway section with relation to the other. It is, therefore, impossible to remove an intermediate section without disturbing the adjacent sections.

The construction according to the prior application also requires structural means within the housing separate from the housing and spanning the connected bus bar assembly, thus adding to the cost, size and weight of the apparatus.

It is an object of the present invention to provide a busway system including means for clamping the bus bars of one section to corresponding bus bars of another section which permits the removal of one busway section with respect to the other by movement in a direction perpendicular to its length, whereby a busway section may be removed at any point in a busway run without disturbing the adjacent sections.

It is also an object of the present invention to provide a busway system including sections which can be interconnected by a single bolt to provide clamping pressure for all bus bar conductors at each busway joint.

It is a further object of the present invention to provide a busway system in which the means serving to house or enclose the joint between bus sections also serves as an operating part of the joint clamping means.

It is also an object of the invention to provide a busway system incorporating prefabricated lengths which can be joined directly together, i.e., without the necessity of adapting "fittings," at any desired angle.

In accordance with the invention there is provided a busway system including at least two elongated busway sections each having an elongated housing of rectangular cross-section and a number of electrical bus bars supported in parallel relation therein. Each of the bus bars has an exposed contact portion adjacent each end thereof, and transversely adjacent ends are spaced apart to permit the insertion of corresponding bus bar ends of the other section in interleaved overlapped relation. A pressure-applying means is provided within the housing disposed to exert pressure between one side of the set of bus bars and the adjacent inner side wall of the busway housing, to force the group of bus bars against each other and against the opposite inner side wall of the housing thereby applying a tension force on the top and bottom walls of the housing. Means is also provided for operating the pressure-applying means from outside the housing.

In accordance with another aspect of the invention, the bus bar clamping mechanism is made up of parts which include the joint-cover members and parts carried by such joint cover members whereby the joint-cover members perform a dual function and permit an extremely compact construction. Since these parts are removable, the construction permits unrestricted movement of the ends of the sections in assembly and disassembly of the joint.

In accordance with another aspect of the invention, the insulating spacer members which occupy the space between each adjacent pair of overlapped bus bar ends, are mounted on and carried by the end portions of the bus bars, and permit the bars to be overlapped by either longitudinal or transverse relative movement.

The particular limits of our invention will be pointed out in the appended claims. The construction and operation of a particular embodiment of our invention, however, will be clearly understood by reference to the following detailed description taken in conjunction with the accompanying drawings in which;

FIGURE 5 is an exploded perspective view of an end portion of a bus bar conductor of the bus system of FIGURE 1 and an insulating spacer carried thereby;

FIGURE 6 is a sectional elevation view of a modified form of the invention.

FIGURES 7 and 8 are side elevation views of a 90° angle connection and a 45° angle connection respectively, showing how the bus sections may be connected directly together at various angles without the use of adapting "fittings";

FIGURE 9 is a side-elevation of a T connection, showing how three busway sections may be connected directly together, and FIGURE 10 is a fragmentary sectional view taken generally on the line 10—10 of FIGURE 9.

Figure 1:
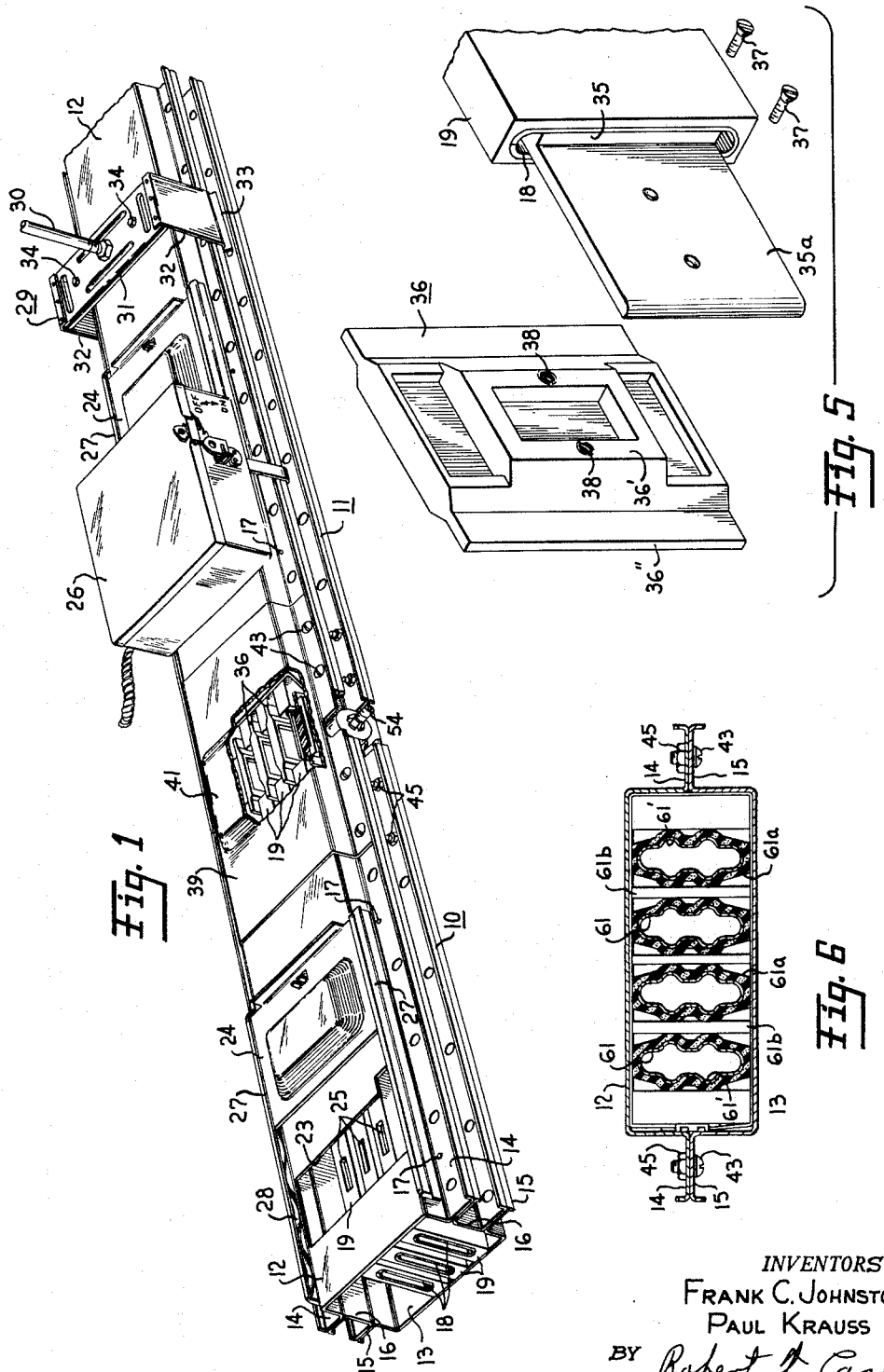
FIGURE 1 is a perspective view of a portion of a busway system incorporating the invention and showing a joint of two successive busway sections, a portion of the joint cover being broken away to expose the joint interior, a busway power take-off plug being shown in place, and a busway hanger shown in connection with one section.

In the drawings, the invention is shown as incorporated in a busway system including two busway sections 10 and 11. Each of the busway sections 10 and 11 includes an elongated duct or housing having a generally rectangular cross section and including generally channel-shaped top and bottom housing members 12 and 13 respectively.

The top and bottom housing members 12 and 13 include outwardly directed flanges 14 and 15 respectively which are rigidly connected to corresponding sides of a channel-shaped spacer member 16 by suitable means, such as by rivets 17.

Three elongated generally tubular, parallel, bus bar conductors 18 are provided within the busway housing, having tubular insulating coatings 19 thereon. The insulating sleeves 19 are preferably formed of "butyl" type synthetic rubber extruded onto the bar 18, as described in our copending application Serial No. 737,954, filed May 26, 1958.

Figure 2:
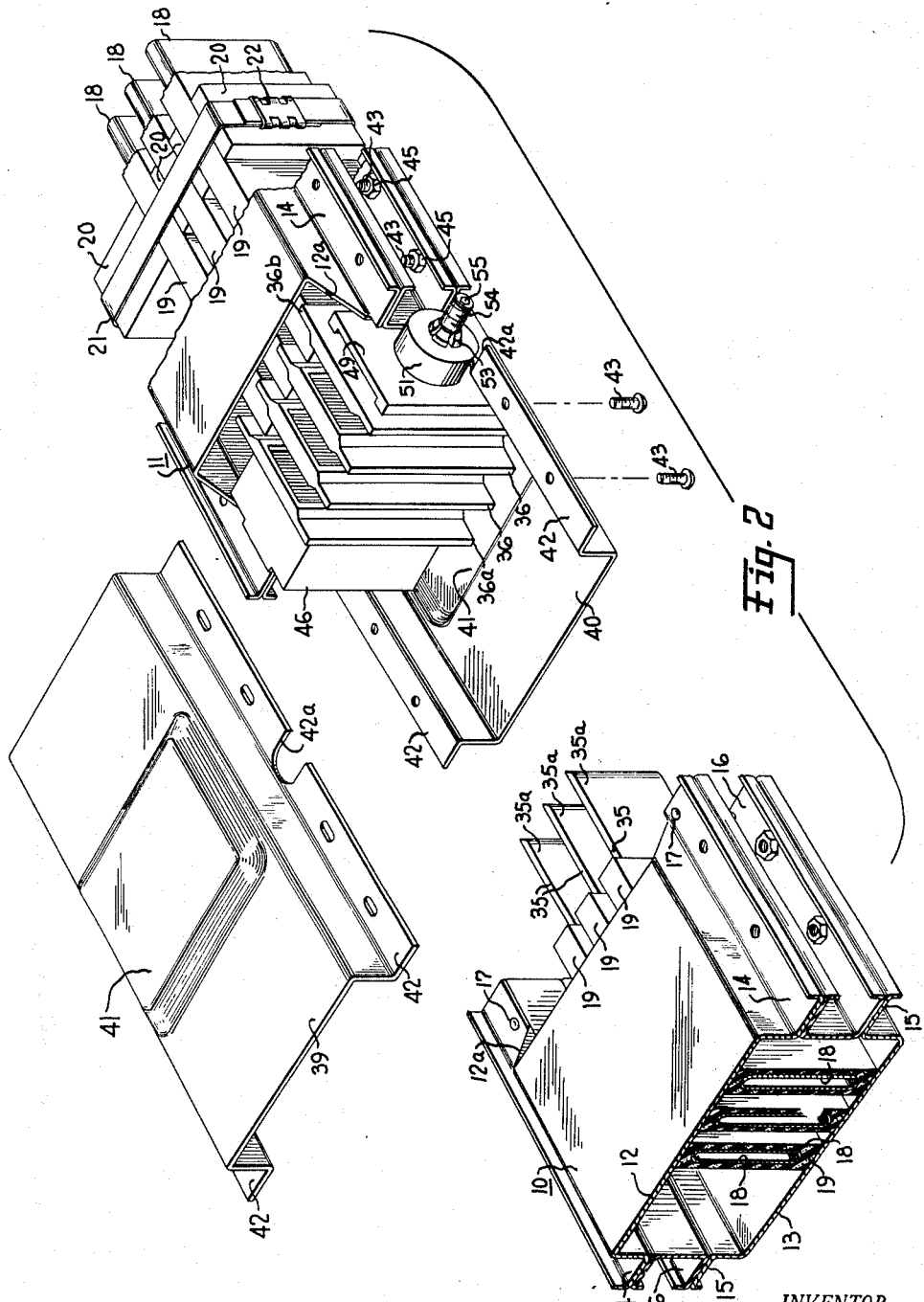
FIGURE 2 is a partially exploded perspective view of the busway joint shown in FIGURE 1, a portion of the busway housing also being removed to disclose the particular insulating supporting means for the bus bars.

Referring to FIGURE 2, the insulated conductors 18 are maintained in spaced-apart, insulated, relation with respect to each other and with respect to the housing throughout their intermediate portion by means of insulating blocks 20, the assembly of insulating blocks and insulated bus bars being tightly compressed and held together by a metal strap 21 having its ends overlapped and connected under tension at 22. While only one assembly of insulating blocks 20 and the strap 21 is shown, this insulating and spacing support assembly is repeated at regular intervals longitudinally throughout each length 10 and 11, there being about one foot between successive insulating supports in one particular embodiment.

The insulated bus bars 18, held together by the several spacer assemblies just referred to, comprise an assembly which is contained within the housing of each section solely by frictional engagement between the insulation 19 and the adjacent inner walls of the top and bottom cover members 12 and 13. For this purpose, the top and bottom cover members 12 and 13 are preferably initially formed with a slight convex or downward curvature of the central portion thereof so that upon bringing the flanges 14 and 15 into proper mounted and connected position, a strong pressure is exerted upon the insulation and upon the conductors 18. This construction provides good mechanical holding of the assembly of bus bars with respect to each of the housings, and also excellent thermal contact between the housing and the bus bar insulation, whereby heat generated in each of the bus bars 18 is rapidly transmitted by conduction to the housing wall and may thereby be radiated to the surrounding air.

The busway housing includes enlarged apertures 23, see FIGURE 1, and sliding covers 24 therefor. Beneath each of the apertures 23, the bus bars 18 and their insulation 19 are provided with elongated openings 25 to receive projecting contact stabs, not shown, of a removable plug-in type power take-off device 26.

Certain aspects of the busway construction shown herein, particularly as regards the provision of double-wall conductors having substantial intimate thermal contact with the busway housing and also longitudinally spaced plug-receiving openings, are shown and claimed in prior aplpication Serial No. 514,926, filed June 13, 1955, by Raymond N. Rowe, and assigned to the same assignee as the present invention, and we therefore do not herein claim anything shown or described in said Rowe application.

The sliding cover 24 is guided and restrained in its movements on the housing by means of inwardly directed overhanging flange portions 27 which overlie edge portions of the cover 24, combined with undulating spring strips 28 between the flanges 27 and the cover 24.

The busway system comprising sections 10 and 11 is ordinarily installed by suspending it from the ceiling or other suitable support by suitable means such as by the hanger 29 comprising a rod 30 having a threaded end attached to a cross-extending member 31 which, in turn, has downwardly extending resilient retaining side portions 32 having inturned edge portions 33 engaging under flange portions of the busway housing. The cross-extending member 31 carries tightening bolts 34 which threadedly engage the cross extending member 31 and press against the upper wall portion of the housing portion 12 to tighten the hanger 29 with respect to the housing. The hanger assembly 29 is disclosed and claimed in our copending application Serial No. 737,555, filed May 26, 1958, and assigned to the same assignee as the present invention.

Figure 3:
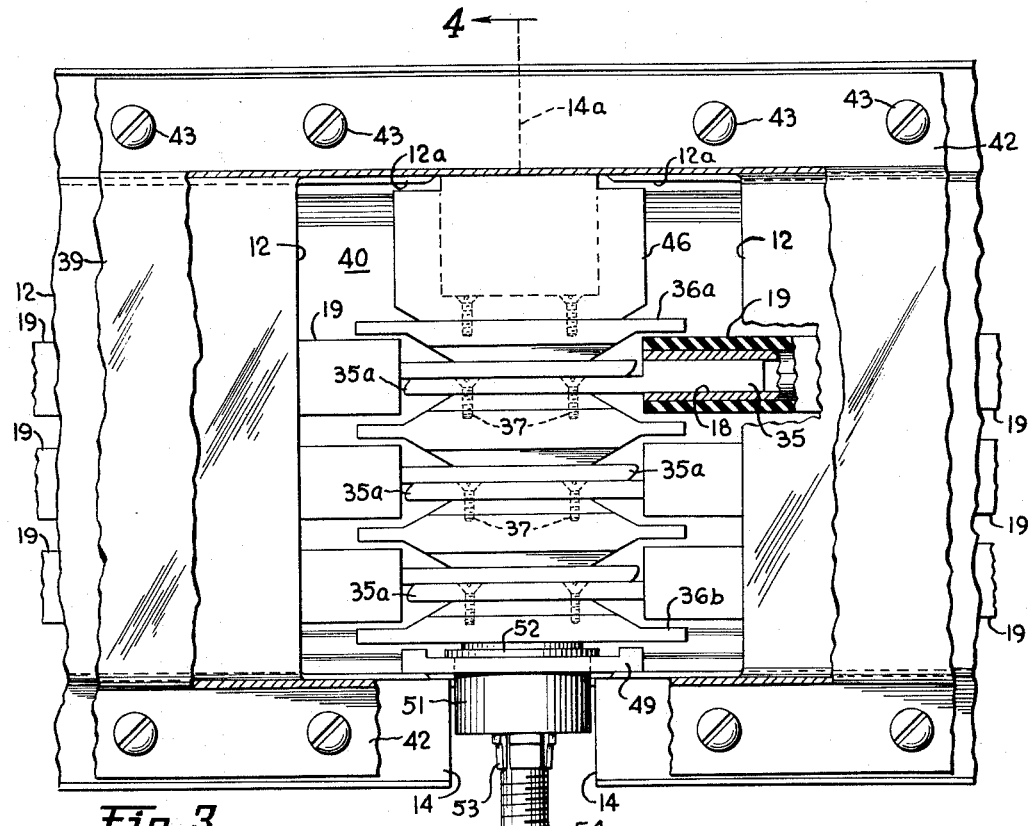
FIGURE 3 is a top plan view, with portions of the covers broken away, of the bus bar joint of FIGURES 1 and 2.
Figure 4:
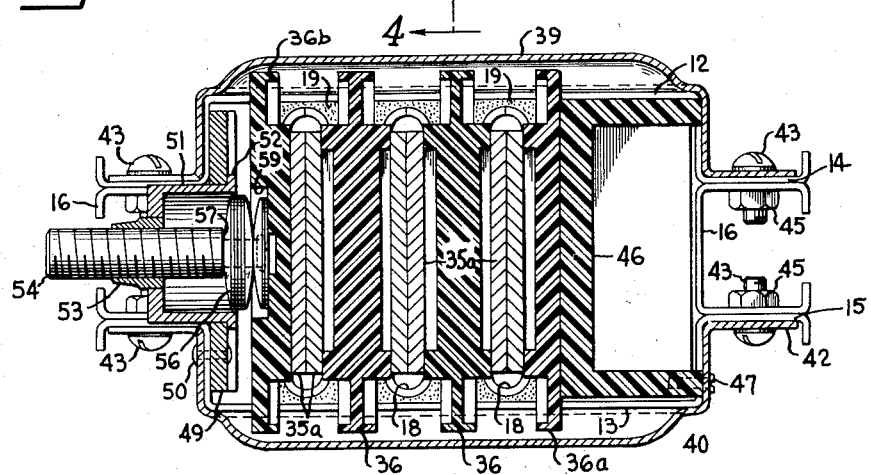
FIGURE 4 is a sectional elevation view of the busway joint of FIGURE 3 taken generally on the line 4—4 of FIGURE 3.

Referring particularly to FIGURES 2–4, the conductors 18 are tubular throughout their intermediate portion. Each conductor 18 is, however, provided with a solid contact member 35 at each end thereof, each including a portion extending within the tubular intermediate portion, and a contact portion 35a projecting therefrom. The contact member 35 is mechanically and electrically joined to the conductor 18 by suitable metallic bonding means such as by brazing or welding. The portion 35a of each contact member 35 projecting beyond the end of the tubular portion of the bus bar conductor 18 is substantially one-half the thickness of the portion contained within the tubular bar, see FIG. 3. Both ends of each conductor 18 are provided with contact members 35 but the cutaway portions of the members 35 are on opposite sides of the bars 18 at each end, so that when two such portions 35a are brought together and overlapped, their total thickness is equal to that of the portion of the contact member within the bars 18.

At one end of each busway section, the projecting portions 35a of the contact members 35 have fixedly attached thereto spacer blocks 36 of insulating material. Thus, referring to FIGURE 2, one end of each busway section is similar to the illustrated end of section 10, with only portions 35a of the contact members 35 projecting therefrom, while the other end of each section is similar to the illustrated end of section 11, with portions 35a of contact members 35 projecting therefrom and carrying the insulating spacer members 36, 36a and 36b. As will be described, the other members shown, including joint clamping members 53, 54, 51 and 46 and joint cover members 39 and 40, are separable from both section ends and not an integral part of either.

The spacer members 36 are preferably fixedly attached to the projecting portion 35a of each contact member 35 by means of screws 37 which enter into threaded metallic inserts 38 in the insulator 36, see FIGURE 5. Each insulator 36 includes a central raised or embossed portion 36' and an outwardly extending peripheral portion 36'' of lesser thickness, for a purpose to be described.

The bus bar assemblies 18 are spaced apart from each other by the insulating blocks 20 a distance such that a space is provided between the exposed face of each insulating block 36 and the side of the adjacent contact portion 35a. This provides a space to accommodate a projecting portion 35a of a corresponding bus bar of the adjoining busway section when the two are in assembled relation, as shown in FIGURE 3.

Referring to FIGURE 2, the top and bottom housing members 12 and 13 respectively of each busway section each have their end portions cut back at an angle as at 12a and 13a from the end portion of the side flanges 14 for the purpose of providing adequate electrical clearance between such housing members and the uninsulated end portions 35a of the bus bar assemblies 18.

For the purpose of joining the adjacent busway sections 10 and 11 mechanically and for supporting the electrical connecting mechanism to be described, as well as for enclosing such joint, connecting means is provided comprising generally channel-shaped top and bottom joint cover members 39 and 40 respectively, each having an outwardly drawn or bumped intermediate portion 41 and outwardly directed flange portions 42. Both the top and bottom joint cover members 39 and 40 are preferably completely separable from the housing sections 10 and 11, but are attached thereto by suitable means such as by bolts 43 passing through the flanges 42, and engaging nuts 45 which are preferably welded in place on the spacer member 16 in alignment with holes corresponding therein.

Referring particularly to FIGURE 4, the bottom joint cover member 40 has a pressure block 46 attached thereto by suitable means such as by screws 47. The pressure block 46 is constructed of insulating material and is generally rectangular in configuration with a hollow center portion. The bottom joint cover also has attached thereto a pressure plate 49 at the side thereof opposite block 46, and suitably attached to the cover 40 such as by rivets 50. The pressure plate 49 is constructed of metal and has a generally cup-shaped guide member 51 rigidly attached thereto and extending through a circular aperture therein and having an outwardly directed peripheral flange 52 overlying the inner surface of the pressure plate 49. The cup-shaped guide member 51 also has a tapped nut portion 53 receiving a bolt 54 in threaded engagement therewith. The bolt 54 has a hexagonal recess 55 (see FIGURE 2) in its outer end to receive a correspondingly shaped wrench to operate it. The bolt 54 has its inner end reduced in diameter and carries thereon a plurality of spring member 56 of the "Belleville" washer type, each comprising a dish-shaped member or resilient metal such as spring steel.

In order to provide the desired force and the desired amount of movement, a plurality of washers 56 are provided, and arranged in the particular manner illustrated, in which the first two spring members adjacent the spacer member 36b are arranged in nested relation with their concave sides directed toward the bus bar assembly, followed by a pair of spring members in nested relation having their concave sides directed away from the bus bar assembly, and finally a third pair of nested spring members having their convex sides directed in the same direction as the first pair. The arrangement of such dish-shaped resilient members in nested relation, i.e., with their convex sides directed in the same direction, is referred to as series relation and the force required to produce a given amount of deflection for such a pair of elements is double that required to produce the same deflection for only one of them. The arrangement in which two such dish-shaped resilient members are arranged in edge-to-edge or mutually confronting relation with their convex sides directed toward each other is referred to as "parallel" relation, and the force required to produce a given amount of deflection is only one-half that required to produce the same deflection in one. In the embodiment shown, a single spring washer produces a force of 1200 lbs. when in flattened condition with a total movement of .050 inch. The combination shown therefore produces a total force of 2400 lbs. with a total travel of .150 inch.

The reduction of the end portion of the bolt 54 produces a shoulder 57 against which the spring members 56 are pressed. The spring members 56 are ertained on the inner end of the bolt 54 by upsetting or heading over the inner end of the reduced portion of the bolt.

The innermost member of the resilient members 56 is received within a shallow recess 59 in the insulating member 36b, the recess 59 having a central extended portion providing clearance for the end of the bolt 54 when the assembly is compressed.

While both the top and bottom cover members 39 and 40 are preferably constructed to be completely separable from the housing sections 10 and 11 as mentioned above, in ordinary usage at least one of the joint cover members, usually bottom cover member 40, is allowed to remain on one of the housing sections such as section 11, as shown in FIGURE 2. Assuming, therefore, that the section 11 of FIGURE 2 represents a busway section already installed in a desired position and supported by suitable hangers, assembly of the next succeeding section, such as section 10, is accomplished by resting the section 10 on the flanges 42 of the projecting portion of the bottom joint cover 40 of section 11 so that the flanges 42 are received within the L-shaped flanges 15 of section 10. The L-shaped flanges 15 of housing 10 then provide a track on which the section 10 is guided as it is slid longitudinally into assembled position, the projecting contact portions 35a of the bus bars 18 entering between the insulators 36 and the corresponding projecting portions 35a of the bus bars of section 11, this movement continuing until the ends of the flanges 14 and 15 of the housings of the two sections abut against each other, as shown at 14a in FIGURE 3, at one side of the assembly.

The top and bottom joint cover members 39 and 40 are provided with a cutaway portion or notch 42a in the flanges at one side thereof in order to provide clearance for the cup-shaped member 51. The flange members 14 and 15 and the intermediate spacer member 16, at this same side of the assembly, are likewise foreshortened with respect to the corresponding portions at the opposite side, likewise to provide clearance for the cup-shaped member 51. The ends of the flange members 14 and 15 and the intermediate spacer member 16, therefore, abut at only one side of the assembly such as at the line 14a in FIGURE 3.

As previously mentioned, in the normal unassembled condition, such as when shipped from the factory to the user, the bottom joint cover 40 and the clamping means carried thereby are attached to the housing section such as 11. The bolt 54 is in retracted condition, in which the resilient members 56 are substantially entirely within the cup-shaped guide member 51. The ends 35a of the bus bars of section 10 may, therefore, easily slide in between the insulators 36 and the corresponding ends 35a of the bus bars of section 11 as the section such as 10 being installed is slid along the flanges 42 to the assembled position as shown in FIGURE 3.

In the next step of the assembly process, the bottom joint cover 40 is mechanically fastened to the bottom housing member 13 of the section 10 by means of four bolts 43 which are inserted into bolted relation with nuts 45 as described above. The top joint cover member 39 is then put in place and bolted to the top housing members 12 of both the sections 10 and 11 by means of other bolts 43 in a similar manner. The housing cover members and the joint cover members are then in assembled relation as shown in FIGURE 4. It will be observed that the top and bottom joint cover members 39 and 40 overlap the top and bottom housing cover members 12 and 13 throughout a substantial portion of their area both at the top, side, and flange portions thereof and span the joint between the section housings in the manner of spliceplates to rigidly connect and reinforce the housing members at this point. It will be observed likewise that the pressure plate members or pressure block members 46 and 49 extend within the mutually adjacent end portions of the housing members of both sections 10 and 11 in the assembled condition, as shown in FIGURE 3, as well as being within the top and bottom joint cover members 39 and 40.

The next step in the assembly process is to tighten the pressure bolt 54, which moves the shoulder 57 inwardly, compressing the resilient members 56 against the side of the insulator member 36b, which force is transmitted in serial relation to all of the overlapped bus bar ends 35a and against the pressure block 46 and finally against the opposite inner side of the housing members and the joint cover members, with a total force, in the embodiment shown, of about 2400 lbs. The opposite sides of the joint cover and housing members are, of course, prevented from moving apart by the intermediate or web portion of these members, which is thereby placed under tension force. In practice, the bolt 54 is run in until the innermost member 56 engages the insulator 36b, and then given a prescribed number of complete turns to establish a desired contact pressure on the overlapped bus bar ends 35a.

Thus only a single bolt need be tightened regardless of the number of overlapped bus bar ends 35a involved.

Moreover, it will be observed that the bolt 54 is always accessible for checking or further tightening if desired, from outside the busway housing, and is at the potential of the busway housing rather than of any bus bars therein.

The insulators 36 include peripheral raised portions 36' at the raised central portion thereof to ensure that the pressure transmitted to each bus bar end 35a is applied over a substantial area. This reduces the stresses exerted on the insulating material of the member 36 and also provides a better electrical and thermal contact of the bus bar ends 35a.

The method of assembly described above is the method which would ordinarily be used in joining consecutive sections. Two such sections may, however, be assembled in other ways, such, for instance, as by initially assembling both the top and bottom joint cover members 39 and 40 on the same section, such as section 11. The end of the other section 10 may then be inserted therein by straight longitudinal movement in a manner similar to that previously described, and the clamp bolt tightened.

When it is desired to disassemble such a busway section, it is only necessary to loosen the single pressure bolt 54 and to disconnect the section desired to be removed from both the top and bottom joint cover members or conversely to disconnect such cover members from the adjacent sections permitting them to be removed with the movable section. When it is desired to remove a busway section from an intermediate point of a busway run, i.e., from between two other sections, the present invention offers substantial advantages. In such a case, a section of the present busway may be removed and replaced by another similar section by movement in a direction perpendicular to the busway run simply by disconnecting the section to be removed from the top joint covers at each end, and disconnecting each bottom joint cover from the adjoining stationary section. The busway section can then be moved directly downwardly and disengaged from the adjoining sections. Also, connected sections may be disconnected by movement in a direction perpendicular to their length in either of two opposite directions, that is, toward either side of the busway. Stated in another way, the bus bar ends 35a may be placed in or removed from their overlapped relation with bus bar ends 35a of a stationary section by movement in any direction within an arc of 180°.

The insulating blocks 36a and 36b are generally similar to the insulating blocks 36 excepting that one side thereof is a smooth planar surface. The insulators 36 and 36b are carried by the ends 35a of the bus bars 18 of the section 11 respectively, as noted above, while the insulating block 36a is attached to and carried by the insulating block 46 by suitable means such as by screws, not shown, or by cementing.

Although the "Belleville" springs are only 1⅛ inches in diameter, they create a force of 2400 lbs. when compressed, in the assembly shown, through a distance of ⁵⁄₃₂ of an inch. It has been determined by test that the electrical resistance through a two-foot section of the busway including such a joint is not greater than the resistance of a two-foot section of busway intermediate the ends of a section.

The joint constructed in accordance with the present invention has the further advantage that it permits a small amount of slipping to occur due to thermal expansion of the conductors and thereby avoids damage to the busway system or the requirement for special "expansion" joints. The insulators 36, 36a, 36b are preferably constructed of a modified polyester molding resin plastic material reinforced by chopped glass fibers.

In FIGURE 6 there is shown another embodiment of the invention including top and bottom housing members 12 and 13 similar to those shown in the previous embodiment. In this embodiment, however, the intermediate channel-shaped spacer members 16 are omitted and the top and bottom housing cover mmebers are bolted directly together. This construction is used where smaller bus bars are used, such as in lower ampere rating busways. This form includes bus bar conductors 61 which are tubular in form and coated with insulation 61a and supported in spaced-apart relation within the housing by insulation spacers 61b. The conductors 61 include pairs of outwardly formed ribs 61' along each of the two opposite sides thereof. The bus bars 18 and the bus bars 61 are preferably constructed by roll-forming from strip metal stock. Certain aspects of the conductor construction and insulation are set forth and claimed in our aforementioned application Serial No. 737,954. The ribs 61' serve to increase the mechanical strength of each of the conductors 61, thereby permitting the use of thinner gauge metal for such conductors. The construction of the connecting joint for two sections of this busway is similar to that described in connection with previous embodiment.

In the embodiment of FIGURE 6, four conductors 61 are shown, representing one conductor for each phase of a three-phase electrical circuit and a fourth conductor for a grounded conductor. The embodiment of FIGURES 1–5, on the other hand, includes only three conductors. The housing of the form of FIGURES 1–5, however, is constructed so as to accommodate four if desired, in which case the insulating block 46 would be made smaller to accommodate the fourth conductor.

When it is desired to connect two sections of busway such as sections 10 and 11 together at an angle other than a right-angle, prefabricated busways connecting sections or fittings, not shown, may of course be provided, incorporating the desired angle.

It is an advantage of the present invention however, that two busway sections such as 10 and 11 may be connected directly together at any desired angle within relatively wide limits.

Accordingly, in FIGURES 7 and 8 a 90-degree connection and a 45-degree connection are illustrated, respectively, between two busway sections 73 and 74.

The busway sections 73, 74, illustrated in these figures, including the bus bar terminations and insulating and housing means are essentially similar to busway sections 10 and 11 of FIGURES 1–5, excepting that the end portions 73a, 74a of the housing covers are cut back slightly more than the corresponding portions 12a, 13a of the form of FIGURE 1, to provide adequate mechanical and electrical clearance in the angular connected condition. The joint housing, in this form, comprises two generally L-shaped pieces 75 and 76, the clamping bolt 54 and nut 53 being carried by the cover 75 together with insulating spacer block 46, not shown. It will be observed that two busway sections constructed in accordance with the present invention may be brought directly together to provide a juncture at any desired angle, it being necessary only to provide joint cover pieces shaped to accommodate the particular desired angle. Thus in FIGURE 8, a 45-degree angle (divergence from straight) is shown using housing covers 77 and 78.

Furthermore, FIGURE 9 illustrates a directly connected T connection comprising the juncture of three busway sections, 73, 74, 74', and including three joint covers, 79, 80 and 81. This connection is formed utilizing three busway sections of the type shown in FIGURES 7 and 8, but including insulators 82 which are of reduced thickness to permit the insertion of bus bar terminations 74'a of a third busway section 74', as shown in FIGURE 10.

It will be observed that since the busway sections described above may be connected directly together even when angular bends such as 90-degrees or a T connection are involved, the necessity for separate connecting fittings is eliminated, with substantial attendant savings.

While we have shown only certain specific embodiments of our invention, it will be appreciated that many modifications may be made by those skilled in the art. We therefore intend by the appended claims to cover all such modifications as fall within the true spirit and scope of our invention.

What we claim as new and desire to secure by Letters Patent of the United States is:

1. A busway comprising an elongated housing having at least two opposed side walls, at least two elongated generally parallel bus conductors in said housing having contact portions in overlapping electrically contacting engagement, means cooperating with said housing for clamping said overlapping bus conductors together including a tapped member engaging one of said walls, a bolt threadedly engaged in said tapped member, at least one circular dish-shaped spring washer carried by said bolt and disposed to exert a force against said bus conductors to resiliently compress all of said contact portions together and toward the side wall opposite said one side wall, said tapped member comprising a cup-shaped portion having a tapped aperture in the bottom wall thereof and having a flange portion extending from the open end thereof in engagement with the inside surface of said one side wall, said cup-shaped portion having an internal diameter slightly larger than the diameter of said circular dish-shaped spring washer, whereby said dish-shaped spring washer may be retracted into said cup-shaped portion when said bolt is in a retracted position.

2. A busway comprising at least two busway sections, each of said sections including an elongated housing of generally rectangular cross-section and at least two elongated generally parallel bus conductors supported in insulated relation in said housing and including exposed contact portions arranged in a row adjacent at least one end thereof and projecting beyond the corresponding end of said housing, whereby said bus conductor contact portions overlap each other when said busway section housings are brought in end-to-end aligned abutting relation, and busway section connecting and clamping means comprising a pair of splice-plate covers, means for connecting said splice-plate covers to corresponding ends of each of said busway sections to cover the joint therebetween and to mechanically interconnect said busway section housings, and means for clamping said overlapped bus conductor contact portions together comprising a generally cup-shaped nut member having a flange at the open end thereof extending partly within each of said adjacent busway section housings and engaging an inner side wall of each of said housings respectively, a tapped aperture in the bottom wall of said cup-shaped member, a bolt threadedly engaged in said tapped aperture with its head accessible from outside said housing and carrying a resilient member on its inner end within said housing and arranged to exert a resilient compressive force against one side of said overlapped contact portions of said bus conductors when said bolt is turned inwardly, said bolt and said resilient member being retractable into said cup-shaped member, said splice plate covers operating in tension to transmit said compressive force to the other side of said overlapped contact portions.

3. A busway system comprising at least two busway sections, each of said sections having an elongated housing of generally rectangular cross-section having end walls connected by side walls and a plurality of elongated generally parallel bus conductors mounted in insulated relation in a row therein and having exposed contact portions adjacent the ends thereof, said busway section housings each having a portion of at least one side wall thereof foreshortened with relation to the end walls thereof to provide an open space between the corresponding ends of said one side wall when said busway housing sections are in end-to-end aligned abutting relation at the said end walls, and combined joint cover and clamping means comprising at least one joint splice-plate cover, means for connecting said joint splice-plate cover rigidly to each of the abutting end portions of said busway section housings to provide both a mechanical connection between the end walls of said busway section housings and a cover for said open space, a first pressure member having an enlarged portion within said housing and extending partly into each of said abutting housings and pressing against an inner end wall surface of each of said housing sections, a tapped aperture in said first pressure member intermediate the said foreshortened side walls of said housing sections, and a bolt threadedly engaged in said tapped aperture and having its inner end disposed and arranged to exert a force on said overlapped bus bar contact portions urging them into compression against the other end wall, thereby tensioning said splice plate cover.

References Cited in the file of this patent

UNITED STATES PATENTS

| | | |
|---|---|---|
| 2,043,796 | Frank | June 9, 1936 |
| 2,059,986 | Frank et al. | Nov. 3, 1936 |
| 2,253,550 | Bohn | Aug. 26, 1941 |
| 2,274,422 | Mahoney et al. | Feb. 24, 1942 |
| 2,350,601 | Frank et al. | June 6, 1944 |
| 2,653,991 | Dyer et al. | Sept. 29, 1953 |
| 2,906,811 | Fisher | Sept. 29, 1959 |

FOREIGN PATENTS

| | | |
|---|---|---|
| 123,336 | Austria | June 10, 1931 |

OTHER REFERENCES

Electrical World, Nov. 14, 1955, page 153.
Electronic Design, Apr. 15, 1957, pages 122–123.